US008085264B1

(12) United States Patent
Crow et al.

(10) Patent No.: US 8,085,264 B1
(45) Date of Patent: Dec. 27, 2011

(54) TILE OUTPUT USING MULTIPLE QUEUE OUTPUT BUFFERING IN A RASTER STAGE

(75) Inventors: Franklin C. Crow, Portola Valley, CA (US); Jeffrey R. Sewall, Pleasanton, CA (US)

(73) Assignee: NVIDIA Corporation, Sata Clara, CA (US)

( * ) Notice: Subject to any disclaimer, the term of this patent is extended or adjusted under 35 U.S.C. 154(b) by 414 days.

(21) Appl. No.: 11/494,399

(22) Filed: Jul. 26, 2006

(51) Int. Cl.
G06T 15/00 (2006.01)

(52) U.S. Cl. ........ 345/419; 345/506; 345/531; 345/552; 345/582; 709/250; 712/22

(58) Field of Classification Search .......... 345/506, 345/558, 419, 552, 582; 712/22; 709/250
See application file for complete search history.

(56) References Cited

U.S. PATENT DOCUMENTS

| 4,208,810 | A | 6/1980 | Rohner et al. | |
|---|---|---|---|---|
| 4,918,626 | A | 4/1990 | Watkins et al. | |
| 5,543,935 | A | 8/1996 | Harrington | |
| 6,259,460 | B1 * | 7/2001 | Gossett et al. | 345/552 |
| 6,323,874 | B1 | 11/2001 | Gossett | |
| 6,480,205 | B1 | 11/2002 | Greene et al. | |
| 6,611,272 | B1 * | 8/2003 | Hussain et al. | 345/531 |
| 6,614,448 | B1 | 9/2003 | Garlick et al. | |
| 6,717,576 | B1 | 4/2004 | Duluk, Jr. et al. | |
| 6,734,861 | B1 | 5/2004 | Van Dyke et al. | |
| 6,803,916 | B2 * | 10/2004 | Ramani et al. | 345/506 |
| 6,938,176 | B1 | 8/2005 | Alben et al. | |
| 6,956,579 | B1 | 10/2005 | Diard et al. | |
| 6,961,057 | B1 | 11/2005 | Van Dyke et al. | |
| 7,002,591 | B1 * | 2/2006 | Leather et al. | 345/582 |
| 7,061,495 | B1 * | 6/2006 | Leather | 345/506 |
| 7,075,542 | B1 | 7/2006 | Leather | |
| 7,307,638 | B2 * | 12/2007 | Leather et al. | 345/582 |
| 7,483,029 | B2 | 1/2009 | Crow et al. | |
| 7,634,637 | B1 * | 12/2009 | Lindholm et al. | 712/22 |
| 2002/0130863 | A1 | 9/2002 | Baldwin | |
| 2003/0163589 | A1 * | 8/2003 | Bunce et al. | 709/250 |
| 2004/0085313 | A1 | 5/2004 | Moreton et al. | |
| 2004/0130552 | A1 | 7/2004 | Duluk, Jr. et al. | |
| 2006/0044317 | A1 | 3/2006 | Bourd et al. | |
| 2006/0267981 | A1 | 11/2006 | Naoi | |

FOREIGN PATENT DOCUMENTS

| CN | 101093578 | 12/2007 |
|---|---|---|
| JP | 06180758 | 6/1994 |
| JP | 10-134198 | 5/1998 |
| JP | 11195132 | 7/1999 |
| JP | 2005182547 | 7/2005 |
| WO | 0013145 | 3/2000 |

* cited by examiner

Primary Examiner — Kimbinh T Nguyen

(57) ABSTRACT

A method for multiple queue output buffering in a raster stage of a graphics processor. The method includes receiving a graphics primitive for rasterization in a raster stage of a graphics processor. The graphics primitive is rasterized at a first level to generate a plurality of tiles of pixels related to the graphics primitive. Each tile is then rasterized to determine related sub-portions of each tile. The related sub-portions are transferred to a plurality of output queues. The related sub-portions are subsequently output on a per queue basis and on a per clock cycle basis.

20 Claims, 8 Drawing Sheets

TILE OUTPUT USING MULTIPLE QUEUE OUTPUT BUFFERING IN A RASTER STAGE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Various traversal algorithms and various rasterization methods have been developed for computing from a graphics primitive based description to a pixel based description (e.g., rasterizing pixel to pixel per primitive) in a way such that all pixels within the primitives comprising a given 3-D scene are covered. For example, some solutions involve generating the pixels in a unidirectional manner. Such traditional unidirectional solutions involve generating the pixels row-by-row in a constant direction. This requires that the sequence shift across the primitive to a starting location on a first side of the primitive upon finishing at a location on an opposite side of the primitive.

Other traditional methods involve utilizing per pixel evaluation techniques to closely evaluate each of the pixels comprising a display and determine which pixels are covered by which primitives. The per pixel evaluation involves scanning across the pixels of a display to determine which pixels are touched/covered by the edges of a graphics primitive.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for a rasterization process that can scale as graphics application needs require and provide added performance without incurring penalties such as increased power consumption and/or reduced fabrication yield.

In one embodiment, the present invention is implemented as a method for multiple queue output buffering in a raster stage of a graphics processor. The method includes receiving a graphics primitive (e.g., a triangle polygon) for rasterization in a raster stage of a graphics processor (e.g., a GPU). The graphics primitive is rasterized at a first level to generate a plurality of tiles of pixels related to the graphics primitive. Each tile is subsequently rasterized to determine related sub-portions of each tile (e.g., those sub portions which have some degree of coverage). The related sub-portions are transferred to a plurality of output queues. The related sub-portions are subsequently output on a per queue basis and on a per clock cycle basis (e.g., one sub portion per queue per clock cycle).

In one embodiment, the output queues are configured to receive the related sub-portions on a per queue basis, wherein each of the output queues is configured to output a respective one of the sub-portions on the per clock cycle basis. In one embodiment, the output queues are configured to exchange at least one related sub-portion from one of the output queues to a different one of the output queues. In this manner, the exchanging can balance an output rate of the output queues. Similarly, the exchanging can balance per clock cycle output slots of the output queues. This attribute can ensure a per queue number of related sub portions are output each clock cycle, thereby minimizing the occurrence of any empty slots in one or more of the output queues. For example, subsequent stages of the graphics processor can be fully utilized since related sub portions are output per queue without slots being wasted on any empty or otherwise uncovered sub portions (e.g., those sub portions of the tile which are completely uncovered by the graphics primitive).

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
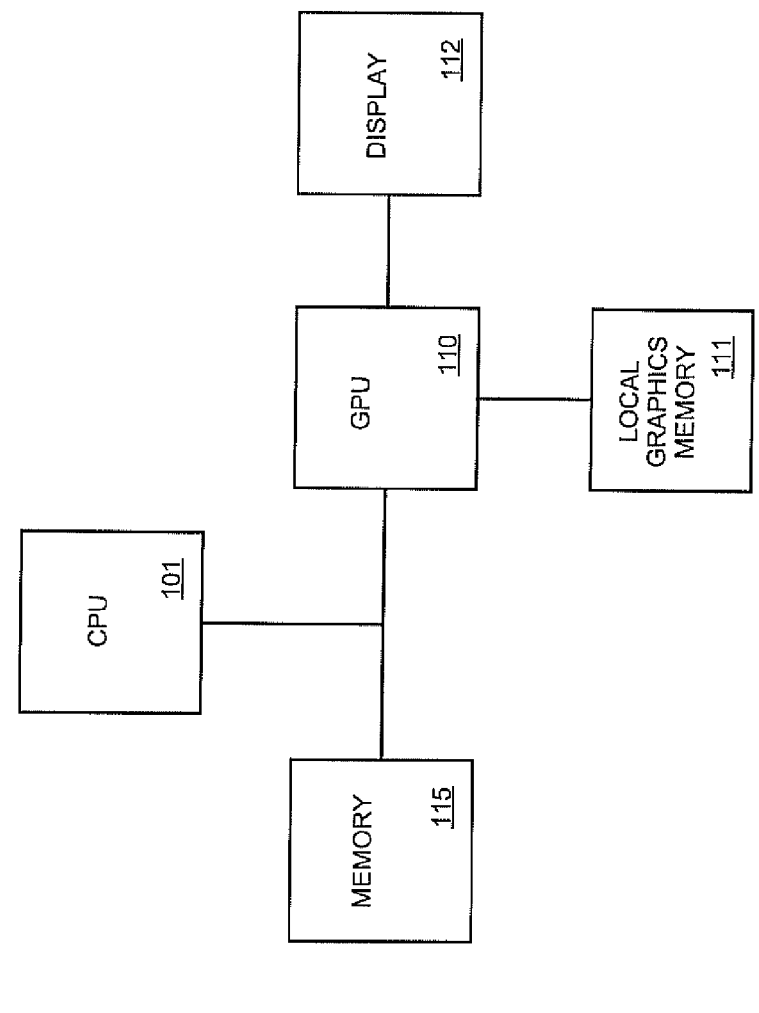
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Embodiments of the present invention implement a method and system for multiple queue output buffering in a raster stage of a graphics processor (e.g., GPU 110 of FIG. 1). The method includes receiving a graphics primitive (e.g., a triangle polygon) for rasterization in a raster stage of the GPU 110. The graphics primitive is rasterized at a first level to generate a plurality of tiles of pixels related to the graphics primitive. In general, each tile comprises a group of adjacent pixels (e.g., a 32×32 block of pixels, etc.). A tile is considered related to the graphics primitive if it has at least some degree of coverage by a graphics primitive. Each tile is subsequently rasterized to determine related sub-portions of each tile (e.g., those sub-portions of the tile that have some degree of coverage). Generally, each tile can be subsequently divided into an even number of sub-portions. For example, in one embodiment, a 32×32 tile can include 16 sub-portions of 8×8 pixels. The related sub-portions are transferred to a plurality of output queues. The related sub-portions are subsequently output on a per queue basis and on a per clock cycle basis (e.g., one sub-portion per queue per clock cycle).

Figure 2:
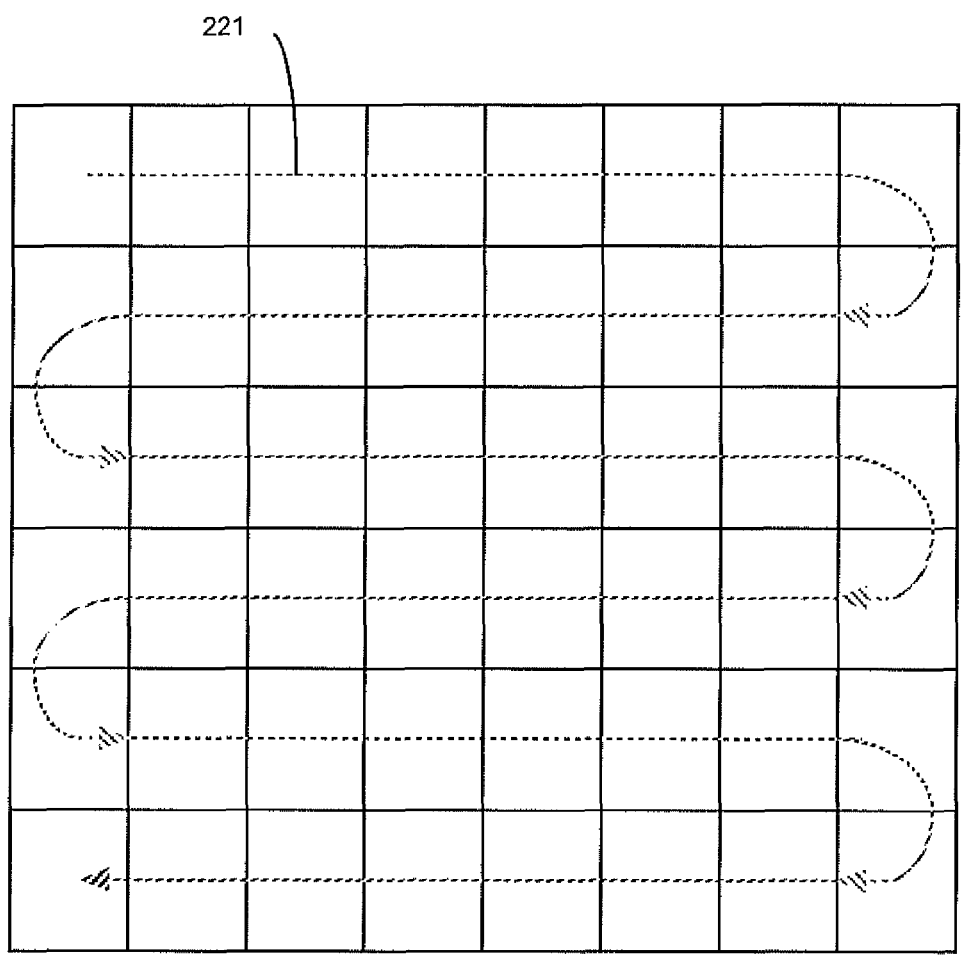
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.).

Additional details regarding boustrophedonic pattern rasterization can be found in US patent application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
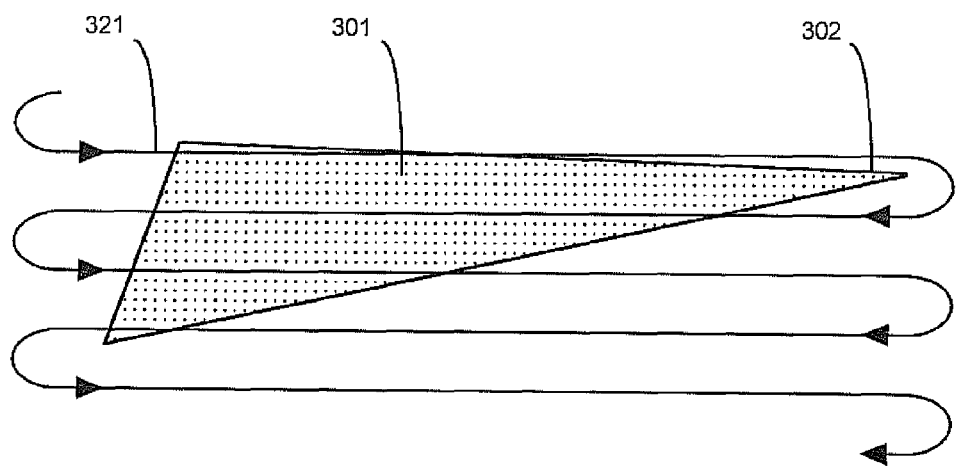
FIG. 3 shows a diagram of a triangle polygon against a rasterization pattern for a raster unit of a GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. In the FIG. 3 embodiment, this initial rasterization pattern is performed at the first level, or at a coarse rasterization level. A coarse raster unit of the GPU 110 traverses the triangle 301 and stamps out tiles that cover the triangle 301.

Figure 4:
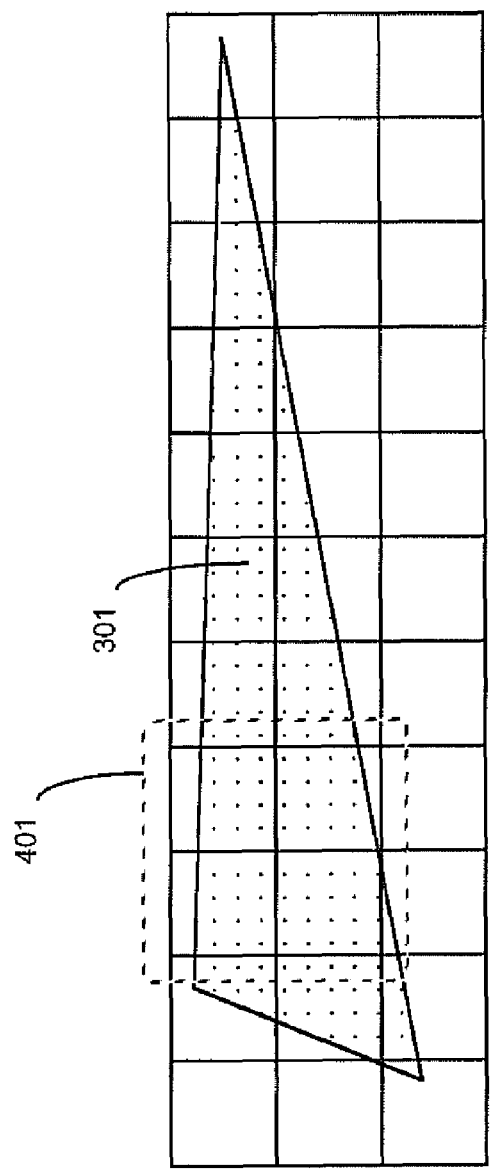
FIG. 4 shows a diagram of the triangle against a grid of tiles as they are being examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares represents a tile comprised of pixels (e.g., 32×32, 16×16, etc.). FIG. 4 shows a case where the first level rasterization produces tiles comprised of four quadrants each, such as the exemplary tile 401.

As described above, in one embodiment, the first level rasterization generates a tile (e.g., tile 401) comprising a set of pixels related to the graphics primitive (e.g., a tile that has at least some coverage with respect to the primitive). Generally, the first level rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than the traditional prior art process which utilizes a single level of rasterization and examines much smaller numbers of pixels at a time, in a more fine-grained manner.

Figures 5, 6:
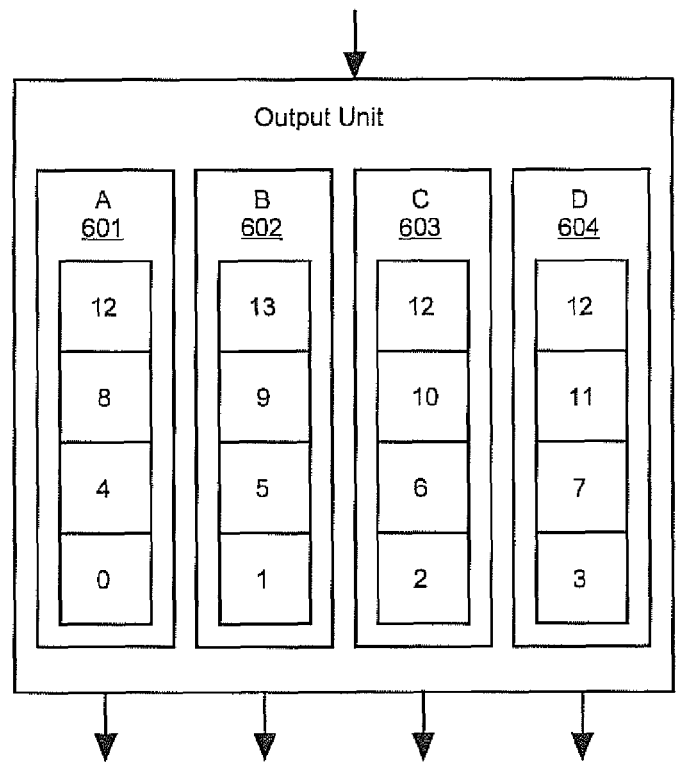
FIG. 5 shows a diagram depicting a tile as stamped out by a coarse raster unit in accordance with one embodiment of the present invention.
FIG. 6 shows an output unit having multiple output queues in accordance with one embodiment of the present invention.

FIG. 5 shows a diagram depicting a tile as stamped out by a coarse raster unit in accordance with one embodiment of the present invention. An exemplary tile 501 is shown.

The FIG. 5 the embodiment shows the four quadrants of the tile 501 and shows the four sub-portions that make up each quadrant of the tile 501. As illustrated in FIG. 5, the top left quadrant comprises the sub-portions labeled 0 through 3, the top right quadrant comprises the sub-portions labeled 4 through 7, the bottom left quadrant comprises the sub-portions labeled 8 through 11, and the bottom right quadrant comprises the sub-portions labeled 12 through 15.

As described above, the coarse raster unit examines relatively large groups of pixels at a time in order to quickly find those pixels that relate to the primitive. Accordingly, tiles can include large numbers of pixels, such as, for example, 1024 pixels in a 32×32 arrangement. Once relevant tiles are identified, embodiments of the present invention subdivide the large tile into constituent sub-portions as shown in FIG. 5 to facilitate a fine-grained rasterization. Thus, for example, in the FIG. 5 embodiment, the 16 sub-portions are evaluated to determine whether they have any relation to the given graphics primitive. Those sub-portions that have at least some coverage are identified and transferred to output queues for subsequent output to a fine raster unit.

It should be noted that although embodiments of the present invention are described in the context of tiles having 16 sub-portions, tiles having other configurations and other numbers of sub-portions (e.g., 32 sub-portions, 64 sub-portions, etc.) can be implemented and are within the scope of the present invention.

FIG. 6 shows an output unit 600 in accordance with one embodiment of the present invention. As depicted in FIG. 6, the output unit 600 includes a plurality of output queues 601-604.

Output unit 600 shows four output queues 601-604. As described above, in one embodiment, once a given tile is determined to have some coverage from a graphics primitive, that tile is subsequently rasterized to determine its related sub-portions. In the FIG. 6 embodiment, the related sub-portions are transferred to output queues on a per quadrant basis. Accordingly, with respect to the tile 501 of FIG. 5, this is shown in FIG. 6 as the sub-portions of the top left quadrant being stored in output queue A, the sub-portions of the top right quadrant being stored in output queue B, the sub-portions of the bottom left quadrant being stored in output queue C, and the sub-portions of the bottom right quadrant being stored in output queue D.

In the FIG. 6 embodiment, each output queue is configured to handle its respective quadrant location of a given tile. In the present embodiment, output queue A stores the top left sub-portion of each quadrant, output B stores the top right sub-portion of each quadrant, output queue C stores the bottom left sub-portion of each quadrant, and output queue D stores about right sub-portion of each quadrant. Each respective output queue is configured to store those related sub-portions of its quadrants that have some coverage. The sub-portions are subsequently output from the output unit 600 on a per queue, per clock cycle basis. For example, output unit 600 is illustrated as having the sub-portions arrive from the top and subsequently drain from the bottom. Accordingly, in a case where all of the sub-portions of the tile 501 have coverage, the sub-portions 0-3 will be output on the first clock cycle, 4-7 will be output on the next clock cycle, 8-11 will be output on the third clock cycle, and 12-15 will be output on the subsequent clock cycle.

In this manner, the related sub-portions of the tile are output such that the sub-portions are adjacent to one another (e.g., within the same quadrant). This locality of memory reference aspect improves the chances that the related data for the sub-portions will be stored within caches have a comparatively low latency access.

Figure 7:
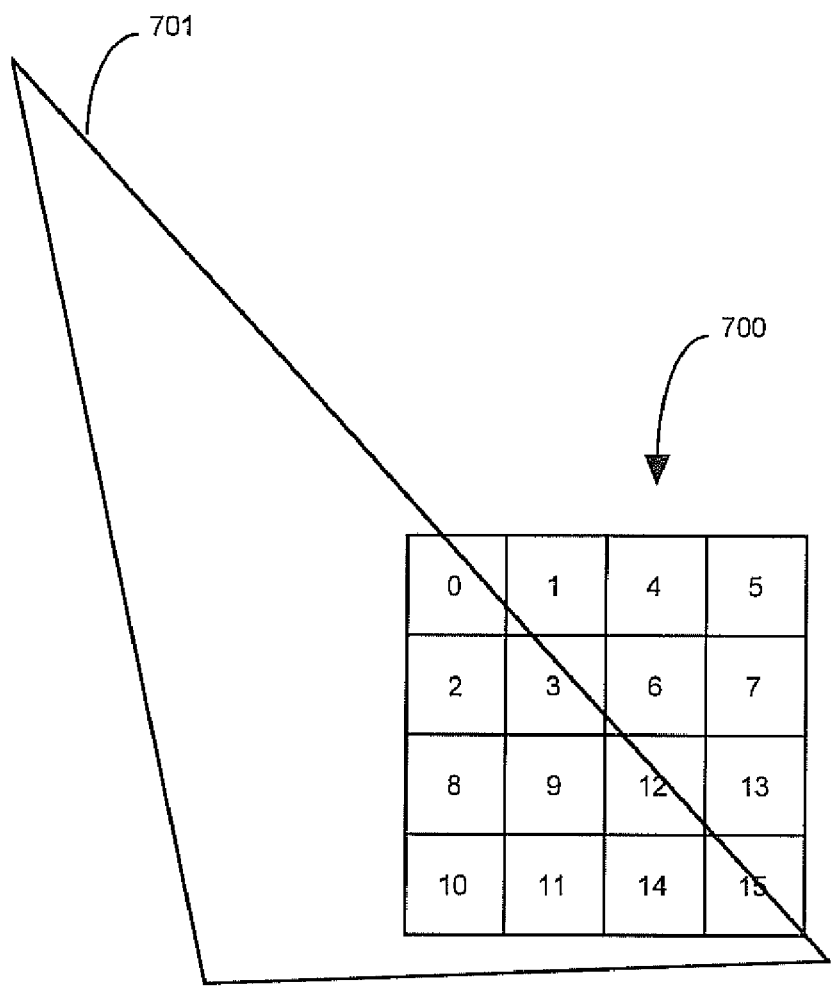
FIG. 7 shows a case where a given tile has only partial coverage from a graphics primitive in accordance with one embodiment of the present invention.

FIG. 7 shows a case where a given tile 700 has only partial coverage from a graphics primitive 701 in accordance with one embodiment of the present invention. As described above, only those sub-portions that have at least some degree of coverage are output for subsequent processing. Accordingly, the sub-portions 1, 4, 5, 6, 7, and 13, which have no coverage, can be discarded. FIG. 7 shows a case where one quadrant (e.g., the top right quadrant) is completely uncovered and where the other three quadrants have some degree of coverage.

Figure 8:
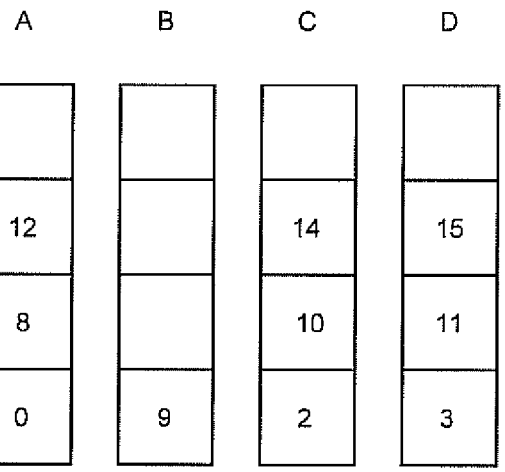
FIG. 8 shows an exemplary arrangement of the covered sub-portions of a tile in accordance with one embodiment of the present invention.

FIG. 8 shows an exemplary arrangement of the covered sub-portions of the tile 700 in accordance with one embodiment of the present invention.

As described above, each output queue is configured to handle its respective location of each quadrant of a given tile and to store those related sub-portions of its quadrants that have some coverage. This is shown in FIG. 8, with respect to the tile 700 of FIG. 7, as output queue A having sub-portions 0, 8, and 12, output queue B having sub-portion 9, output queue C having sub-portions 2, 10, and 14, and output queue D having sub-portions 3, 11, and 15. The related sub-portions are subsequently output on a per queue, per clock cycle basis. Embodiments of the present invention advantageously exchange sub-portions in order to minimize the loss of any output slots. This aspect is illustrated in FIG. 9 below.

Figure 9:
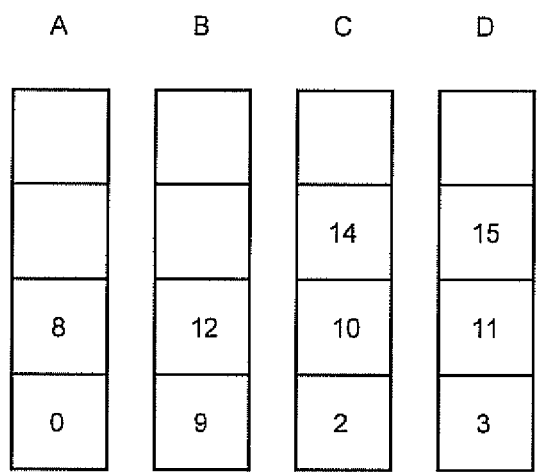
FIG. 9 shows an exemplary arrangement of the covered sub-portions of a tile after the sub-portions have been exchanged accordance with one embodiment of the present invention.

FIG. 9 shows an exemplary arrangement of the covered sub-portions of the tile 700 in after one sub-portion has been exchanged accordance with one embodiment of the present invention. FIG. 9 shows a case where the sub-portion 12 has been exchanged from a later slot of output queue A to an earlier empty slot of output queue B.

In this manner, in one embodiment, the output queues are configured to exchange at least one related sub-portion from one of the output queues to a different one of the output queues. The exchanging can balance an output rate of the output queues, such as, for example, preventing one of the output queues for running empty while the other output queues have sub-portions to transfer. Similarly, the exchanging can balance per clock cycle output slots of the output queues, such as, for example, ensuring four sub-portions are output each clock cycle as long as possible.

These attributes can ensure a per queue number of related sub-portions are output each clock cycle, thereby minimizing the occurrence of any empty slots in one or more of the output queues. For example, the subsequent stages of the graphics processor can be fully utilized since related sub-portions are output per queue without slots being wasted on any empty or otherwise uncovered sub-portions (e.g., those sub-portions of the tile which are completely uncovered by the graphics primitive).

It should be noted that although sub-portions can be exchanged between the output queues, it is preferable that sub-portions are output with adjacent sub-portions in order to maintain their locality of memory reference. For example, in an implementation where each tile comprises 1024 pixels (e.g., 32×32), and where each of the related sub-portions comprises 64 pixels (e.g., 8×8), the output queues can be configured to ensure that the related sub-portions that are output on a per clock cycle basis are within an output area of two blocks comprising 16×16 pixels each.

Figure 10:
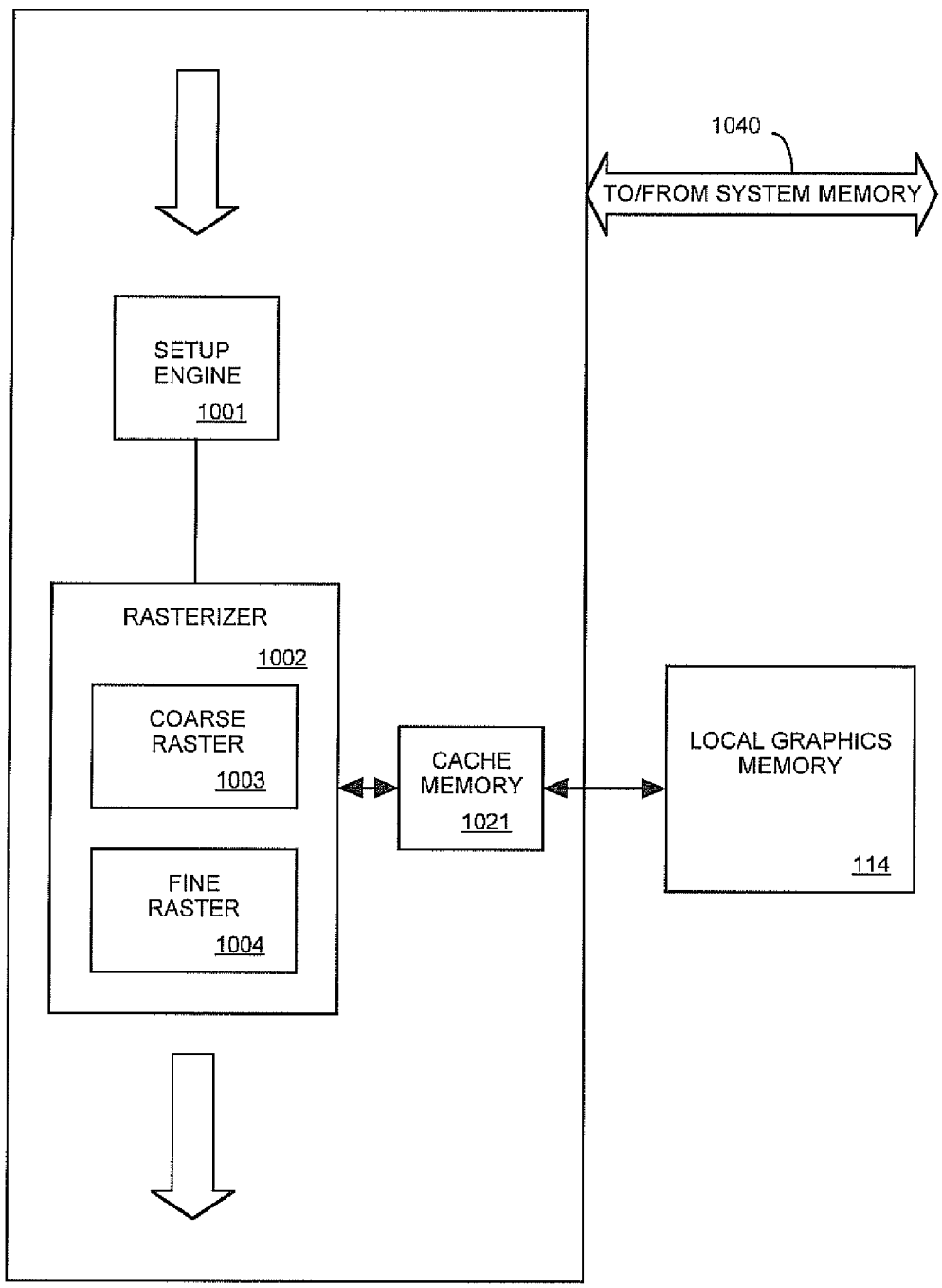
FIG. 10 shows a diagram of internal components of a GPU in accordance with one embodiment of the present invention.

FIG. 10 shows a diagram of internal components of the GPU 110 in accordance with one embodiment of the present invention. As shown in FIG. 10, the GPU 110 includes a setup engine 1001 and a rasterizer unit 1002. In the present embodiment, the functionality of the present invention is implemented within the hardware and software of the rasterizer unit 1002. Generally, the set up unit 1001 functions by converting descriptions based on vertices to descriptions based on edge descriptions. The rasterizer unit 1002 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the FIG. 10 embodiment, the rasterizer unit 1002 includes a coarse raster component 1003 and a fine raster component 1004. The coarse raster component 1003 implements the tile based rasterization process as described above, as it rapidly searches a grid of tiles to identify tiles of interest (e.g., tiles that are covered by a primitive). Once the related tiles are identified, the fine raster component 1004 individually identifies the pixels that are covered by the primitive. Hence, in such an embodiment, the coarse raster component 1003 rapidly searches a grid of pixels by using tiles, and the fine raster component 1004 uses the information generated by the coarse raster component 1003 and implements fine granularity rasterization by individually identifying pixels covered by the primitive.

Referring still to FIG. 10, the GPU 110 further includes a cache memory 1021 that functions by implementing high-speed low latency storage for the most frequently used graphics rendering data. Such data typically comprises texture information, vertex information, colors, and the like. The cache memory 1021 is shown coupled to the local graphics memory 114. The cache memory 1021 utilizes one or more cache maintenance mechanisms to maintain coherency with the local graphics memory 114. The arrow 1040 shows the communications pathway between the GPU 110 and the system memory (e.g., memory 115 shown in FIG. 1).

In one embodiment, the hardware comprising the raster unit 1002 is optimized for operations on a per clock basis. For example, to provide high throughput and thereby maintain high rendering frame rates, the coarse raster component 1003 and the fine raster component 1004 comprise hardware designed to implement the first level rasterization and the second level rasterization on a per-clock cycle basis. The rasterizer unit 1002 can be implemented such that the first level rasterization is implemented in the coarse raster component 1003 that "stamps out" tiles covering a given primitive within a single clock cycle. Subsequently, the rasterization at the second level can be implemented in the fine raster component 1004 that stamps out the covered pixels of a tile in a single clock cycle.

In one embodiment, wherein the first level rasterization is performed by the coarse rasterization component 1003 and the related sub-portions are output for rasterization at a second-level at the fine raster component 1004. In this manner, embodiments of the present invention provide a method and system for a rasterization process that can scale as graphics application needs require and provide added performance without incurring penalties such as increased power consumption and/or reduced fabrication yield.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a raster stage of a graphics processor, a method for multiple queue output buffering, comprising:
   receiving a graphics primitive for rasterization in a raster stage of a graphics processor;
   rasterizing the graphics primitive at a first level in a coarse rasterization unit to generate a plurality of tiles of pixels related to the graphics primitive; and
   rasterizing each tile in a fine rasterization unit coupled to receive the output of the coarse rasterization unit, and to determine related sub-portions of each tile;
   transferring related sub-portions to a plurality of output queues; and
   outputting the related sub-portions on a per queue basis and on a per clock cycle, per queue load balanced basis.

2. The method of claim 1, wherein the output queues are configured to receive the related sub-portions on a per queue basis, and wherein each of the output queues is configured to output a respective one of the sub-portions on the per clock cycle basis.

3. The method of claim 2, wherein the output queues are configured to exchange at least one related sub-portion from one of the output queues to a different one of the output queues.

4. The method of claim 3, wherein the exchange is configured to balance an output rate of the output queues.

5. The method of claim 4, wherein the exchange is configured to balance per clock cycle output slots of the output queues.

6. The method of claim 1, wherein the output queues are included within an output unit, and wherein the output unit includes at least four output queues.

7. The method of claim 1, wherein each of the plurality of tiles comprises 1024 pixels, and wherein each of the related sub-portions comprises 64 pixels.

8. The method of claim 1, wherein the related sub-portions output on a per clock cycle basis are within an output area of two blocks comprising 16×16 pixels each.

9. The method of claim 1, wherein the first level rasterization is performed in a coarse rasterization unit, and wherein the related sub-portions are output for rasterization at a fine rasterization unit.

10. A GPU (graphics processor unit), comprising:
    a set-up unit for generating polygon descriptions;
    a rasterizer unit coupled to the set-up unit for rasterizing the polygon descriptions;
    a coarse raster unit within the rasterizer unit for rasterizing a graphics primitive at a first level to generate a plurality of tiles of pixels related to the graphics primitive;
    a fine raster unit coupled to receive the output of the coarse raster unit, and for rasterizing each tile to determine related sub-portions of each tile; and
    an output unit within the rasterizer unit for storing the related sub-portions in a plurality of output queues, and for outputting the related sub-portions on a per queue basis and on a per clock cycle, per queue load balanced basis.

11. The GPU of claim 10, wherein the output queues are configured to receive the related sub-portions on a per queue basis, and wherein each of the output queues is configured to output a respective one of the sub-portions on the per clock cycle basis.

12. The GPU of claim 10, wherein the output queues are configured to exchange at least one related sub-portion from one of the output queues to a different one of the output queues to balance an output rate of the output queues.

13. The GPU of claim 10, wherein the output queues are configured to exchange at least one related sub-portion from one of the output queues to a different one of the output queues to balance per clock cycle output slots of the output queues.

14. The GPU of claim 10, wherein each of the plurality of tiles comprises 1024 pixels, and wherein each of the related sub-portions comprises 64 pixels.

15. The GPU of claim 10, wherein the related sub-portions output on a per clock cycle basis are within an output area of two blocks comprising 16×16 pixels each.

16. The GPU of claim 10, wherein the first level rasterization is performed in a coarse rasterization unit, and wherein the related sub-portions are output for rasterization at a second-level on a corresponding fine rasterization unit.

17. A computer system, comprising:
    a system memory;
    a central processor unit coupled to the system memory; and
    a graphics processor unit communicatively coupled to the central processor unit;
    a set-up unit within the graphics processor unit for generating polygon descriptions;
    a rasterizer unit within the graphics processor unit and coupled to the set-up unit for rasterizing the polygon descriptions; and a coarse raster unit within the rasterizer unit for rasterizing a graphics primitive at a first level to generate a plurality of tiles of pixels related to the graphics primitive, a fine raster unit coupled to receive the output of the coarse raster unit, and for rasterizing each tile to determine related sub-portions of each tile; and an output unit within the rasterizer unit for storing the related sub-portions in a plurality of output queues, and for outputting the related sub-portions on a per queue basis and on a per clock cycle, per queue load balanced basis.

18. The computer system of claim 17, wherein the output queues are configured to receive the related sub-portions on a per queue basis, and wherein each of the output queues is configured to output a respective one of the sub-portions on the per clock cycle basis.

19. The computer system of claim 17, wherein the output queues are configured to exchange at least one related sub-portion from one of the output queues to a different one of the output queues to balance an output rate of the output queues.

20. The computer system of claim 17, wherein the output queues are configured to exchange at least one related sub-portion from one of the output queues to a different one of the output queues to balance per clock cycle output slots of the output queues.

* * * * *